Aug. 12, 1969  R. L. FIFER  3,460,677
TRANSPORTABLE SEWAGE TREATING APPARATUS
Filed Oct. 22, 1968
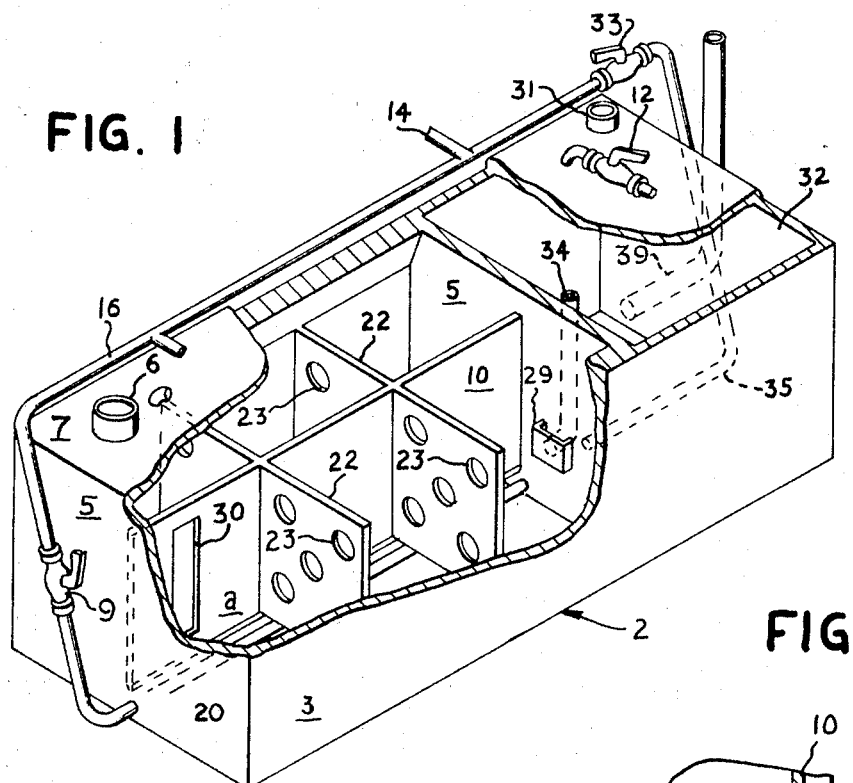
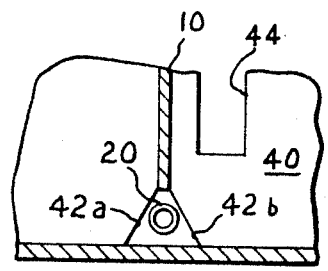
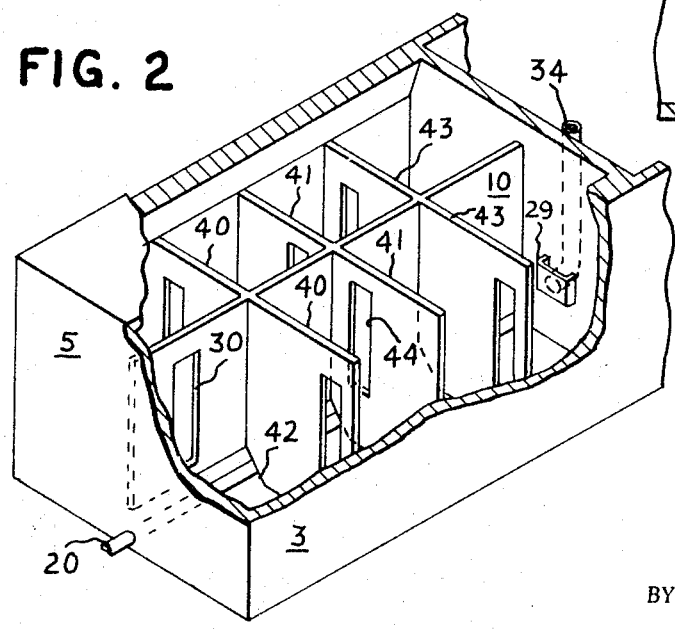
INVENTOR.
ROLLAND L. FIFER
BY Norman L. Wilson Jr.
HIS ATTORNEY

United States Patent Office 3,460,677
Patented Aug. 12, 1969

3,460,677
TRANSPORTABLE SEWAGE TREATING
APPARATUS
Rolland L. Fifer, 6211 Glenhill Road,
Louisville, Ky. 40222
Filed Oct. 22, 1968, Ser. No. 769,605
Int. Cl. C02c 1/26, 1/02; B01d 15/00
U.S. Cl. 210—199                                    5 Claims

ABSTRACT OF THE DISCLOSURE

The activated sludge treatment of sewage involves the use of a tank in which sewage is mixed with previously activated sludge and subjected to the action of bacteria, oxygen being necessary for bacterial action. A sewage treatment plant has been made in the form of a single aeration tank so elongated that its length, or both length and width, exceed its height. This is accomplished by dividing the chamber by the use of at least one substantially vertical impermeable baffle. Since such units are installed in boats, aircraft, and the like, they will often be subjected to a rocking action. Resulting sloshing of the sewage during rocking is mitigated by the apparatus provided herein without disturbing the original circulation pattern.

Background of the invention

The present invention relates to waste treatment plants of the activated sludge type.

In the activated sludge treatment of sewage the method of treatment involves the use of a tank in which sewage is mixed with previously activated sludge and subjected to the action of bacteria. This aerobic treatment is usually carried out in large tanks. Ordinarily the speed of movement of sewage through the tank is slow so that the sewage will remain in the tank a sufficient length of time to allow the bacteria to properly act upon the sewage. Since oxygen is necessary for bacterial action, air distributing means are employed, and these means are usually so arranged as to make it possible for the sewage to receive and absorb from the air as much oxygen as is necessary to support the bacterial action. In order to procure proper action it is also essential to keep the body of sewage in substantially constant movement to avoid any settling or separating out of heavier or more solid particles. Aerobic treatment tanks must, then, be so constructed as to perform the functions of circulation and mixing for a period of time sufficient to purify the material so that the effluent therefrom has a safe biological oxygen demand (B.O.D.).

Sewage aeration tanks are usually at least as high, and generally two to five times as high, as they are wide, with air being introduced at various points in the tank, usually near the bottom. In addition they are two to ten times as long as they are wide. These dimensions have been necessary in order that the air introduced will circulate sufficiently to keep a given amount of solid matter in suspension, and to prevent settling of solid portions. For these reasons it has not been possible to depart drastically from the minimum height to width to length ratios, length being its longer dimension, width its shorter.

However in my copending application Ser. No. 688,237, filed Dec. 5, 1967, a sewage treatment unit was provided which can be used where the available height dimension is shorter than its length dimension, and frequently shorter than both length and width. The sewage treatment apparatus contemplated therein included a single aeration tank so elongated that its length, or both length and width exceeded its height. In order to achieve a circulation pattern resulting in minimization of quiescent areas the chamber was divided by the use of at least one substantially vertical impermeable baffle panel interposed between one pair of opposite tank walls. This arrangement results in a plurality of aeration chambers formed by the baffle panels, the number of baffle panels interposed being such that no aeration chamber operates with width to height ratio greater than one. It is noted that in the aeration tank which is described in my copending application the baffles terminate above the tank bottom so that each aerating chamber communicates with an adjacent chamber. A single open zone of communication is thus formed beneath the baffles. In combination with the baffles air distributor means are employed in each aerating chamber so that the locus of the introduction of the air is along the entire length of the chamber relative to or parallel to the baffle panel so that air bubbles circulating therein create a circulation pattern throughout each circulating chamber.

Summary of the invention

The sewage treatment apparatus of Ser. No. 688,237 satisfy an increasing demand for low units. When operating batchwise they achieve a B.O.D. reduction of from ninety to ninety-five percent of the total B.O.D. present in the inflow. However since they will frequently be installed in buses, boats, floating docks, and aircraft, they will often be subjected to a rocking action. In accordance with this invention sloshing of the sewage suspension during rocking is mitigated by the use of auxiliary panels so constructed that the original circulation pattern within the aeration tank is not disturbed.

Detailed description of the invention

This invention is based on the fact that panels having openings in their walls function as solid panels and therefore confine the liquid in separate chambers if flow passages therethrough are irregularly spaced, and if their total cross-sectional area is less than one-third of the total cross-sectional area of the panel. This and its application to the sewage treatment apparatus of Ser. No. 688,237 can perhaps best be exemplified by reference to the accompanying drawing.

FIG. 1 is a partially cutaway isometric view showing a preferred treatment plant.

FIG. 2 shows another embodiment of the invention.

FIG. 3 is a cross-sectional view of a portion of the apparatus of FIG. 2.

Referring now to FIG. 1 an elongated aeration tank 2 is shown with sides 3, ends 5, a top 7, and a bottom adapted with fillets at the junctures as is known in the art. Desired air circulation is achieved by partitioning the tank into a plurality of aeration chambers with at least one dividing baffle panel 10.

Considering the tank as having short end walls 5 and longer side walls 3, the dividing baffle panel 10 extends between and connects the end walls. The baffle panel is spaced from side walls 3, and is substantially parallel thereto. Dividing baffle panel 10 is secured to end walls 5 so that it extends above the level of the waste liquid at its upper end, and is directed downwardly toward the tank bottom, stopping short thereof as shown in the figure. Baffle panels are made of an impervious material such as plastic, metal, and the like. The open upper portion of tank 2 above the baffles, but beneath top 7, permits excess air from the various chambers formed by the baffles to escape through valve 12 of a vent pipe. A zone of communication is also formed beneath the baffles. This zone or reservoir permits flow of waste liquors between the aeration chambers so as to equalize the B.O.D. in each chamber.

It will be understood that the number of baffles interposed between the walls will depend on the distance between walls approximately parallel to the baffle panels. Whereas a greater number can be employed, the number of dividing baffles generally will be such that no aeration zone is wider than it is high, its width being taken between the baffle and the opposite side wall or end wall, approximately parallel thereto. In other words the width to height ratio provided for the liquid in the chamber should not be greater than one in each aeration chamber, taking width as the distance between a baffle and an opposite side.

To maintain a uniform circulation throughout aeration tank 2, and to prevent or minimize dead spots or quiescent zones, the air distributors are positioned near or at the chamber bottom. A particularly desirable air distributor pipe is an orifice tube 20, through which air admitted at 14 flows. This tube preferably is disposed only a few inches beneath a baffle panel 10, and it is provided with two sets of orifices, every other orifice being a member of one set, the alternate orifices being members of the other set. The orifices of one set are directed toward the aeration chamber on one side of the baffle panel, whereas the orifices of the other set are diverted toward the adjacent aeration chamber on the opposite side of the baffle panel.

Because of dividing panel 10, sloshing between sides 3 presents no real problem when the vehicle which carries the sewage treatment apparatus is rocked. However, sloshing between end walls 5 is sometimes a matter of concern. In accordance with one embodiment of this invention a plurality of auxiliary panels 22 project laterally from the general plane of the dividing baffle as shown in FIG. 1. Each auxiliary baffle 22 is secured at one end to dividing baffle 10 and at the other to the inside of side wall 3. A series of auxiliary panels is used, one being disposed on each side of dividing baffle 10, usually, but not necessarily, opposite each other. Each auxiliary panel extends from the bottom of the dividing baffle to a point above the liquid level in the chamber.

In order not to disturb the circulation pattern within the aeration chambers each auxiliary panel has a multitude of irregularly spaced passages 23 in its wall, defining a plurality of flow ports. Usually the passages will be circular orifices arranged in off-set rows. If adjacent openings are off-set, and if their total cross-sectional area does not exceed one-third of the total panel surface, the net effect is almost that of utilizing a solid panel.

There will be state or other government regulations requiring a chemical treatment of effluent to be released into lakes and waterways regardless of B.O.D. reduction. Accordingly a purification chamber 32 can be incorporated in the apparatus. An effluent withdrawal line 34 leads from the aeration tank to the purification chamber as shown. The mouth of the line is above the bottom of the tank for bacterial retention as described, and desirably a baffle plate 29 is placed in front of the withdrawal line inlet to minimize the flow of any suspended particles into the outlet. In addition, to lessen flow beneath dividing baffle panel 10 an opening 30 is made in baffle panel 10 in a section *a* remote from withdrawal line 34. This insures less disruption of solids retained to support bacterial life beneath dividing baffle panel 10.

Another embodiment of the invention is seen in FIGS. 2 and 3. Auxiliary panel 40 is rectangular or square except for a cut-off bottom corner forming a fifth short side 42a adjacent a similar side 42b in the auxiliary panel on the opposite side of dividing baffle 10. The cut-off corners have the advantage that they permit the auxiliary panels to extend to the bottom of the aeration tank. As can be seen in FIG. 3 the opposite similar fifth sides 42a and 42b form triangular openings serving as connecting passages so that there is still a single zone of communication beneath dividing baffle 10.

If desired the slopes of opposite fifth sides may be increased (negatively) in the direction of outlet 34 so that the apex angle of the triangle formed by panels 40 will be greater than the apex angle formed by panels 41, which in turn will be greater than the apex angle of the triangle formed by panels 43. Desirably the apex angles will be 90°, 60°, and 30° respectively. This will restrict the flow of solids so that there will be fewer solids beneath dividing baffle 10 at the outlet end. The triangular opening formed by short sides 42a and 42b also permits the air distributing header 20 to be disposed at the base of the dividing baffle in the preferred manner.

Since the auxiliary panels are secured to the bottom of the aeration chamber the embodiment shown in FIG. 2 is somewhat more effective than that illustrated in FIG. 1. To further improve the unit of FIG. 1 rectangular openings 44 are used in the auxiliary panels instead of the spaced holes. Preferably the rectangular openings are staggered in position relative to dividing baffle 10 as shown in FIG. 2, the opening in panel 40 being adjacent side 3, the opening in panel 41 being adjacent baffle 10, etc. These openings 44 along with opening 30 which joins the two sides but at a point in the dividing baffle remote from outlet 34 still permit the aeration chamber to function as a single chamber and do not disturb the basic circulation pattern.

In units which are the subject of this invention circulation is maximized but turbulence or sloshing is minimized. As a result of circulation achieved and the open zone beneath the dividing baffle the solid-bearing liquid becomes about equally distributed in all of the aeration chambers. At the time sewage enters through pipe 6 air is being brought into an air line 16 through air inlet 14, and by valve 9 is diverted to air distributing tube 20 suitably placed, as described, for the purpose of releasing air bubbles across the length of the tank. Air vent valve 12 is opened during operation so that there will be no pressure buildup within the tank.

Outlet conduit 34 is provided for the withdrawal of effluent from the tank after it has been allowed to settle. The auxiliary panels 22 or 40, 41 and 43 are particularly effective during the settling period. The conduit is so placed that solids-bearing liquid remains in the tank for bacterial retention. It is generally more efficient to position the effluent conduit so that one-fourth to one-third of the solids-bearing liquid remains in the tank.

To operate purification chamber 32 a chemical purifier such as a chlorine compound is introduced through inlet 31. In addition valve 33 is opened so that air, serving as a mixing means, is introduced through openings or perforations in conduit 35. To empty this chamber valve 12 is closed with air still being admitted through tube 35. The air fills the space above the liquid in the chamber and then forces the purified effluent through effluent outlet 39. Here again gravity flow can be used where possible. Thus it is obvious that various modifications of the invention will occur to those skilled in the art. Thus any number of auxiliary panels can be used with the aeration chambers and in addition any shape and irregular arrangement of openings will be used, such as stars and the like. Usually the sizes of the orifices will be such that their total area, i.e. the area of one or more openings, is about one-tenth of the area of the auxiliary panel. Other variations will occur to those skilled in the art and such ramifications are deemed to be within the scope of this invention.

What is claimed is:
1. In a sewage treatment apparatus of the activated sludge type which includes an aeration tank with air diffuser means positioned therein to maintain sewage solids in suspension and to provide oxygen for aerobic biological action, wherein the aeration tank is elongated so as to fit into vehicles such as boats, buses, and trailers, wherein at least one vertical impermeable dividing baffle panel is interposed between one pair of opposite tank walls forming a transverse partition connecting the other pair of walls between a point above the normal liquid level in the upper portion of the tank and the tank bot- tom, dividing the tank into a plurality of aeration chambers, a zone of communication being formed beneath the baffles, wherein air distributor means are positioned near the bottom of the tank, in a manner so that air is introduced parallel to the baffle panel along its entire length, means mitigating sloshing of the sewage suspension on rocking of the vehicle comprising a series of auxiliary panels projecting laterally from the dividing baffle on opposite sides thereof between the dividing panel and the wall parallel to the dividing baffle, said auxiliary panels being secured to the dividing baffle and to the wall, said auxiliary panels having spaced passages in their wall defining flow ports whose total cross-sectional area does not exceed one-third of the auxiliary panel area.

2. The apparatus of claim 1 wherein the dividing baffle is provided with an opening in a section remote from the liquid outlet to permit liquid circulation therethrough during its withdrawal.

3. The apparatus of claim 1 wherein the auxiliary panel extends from a point above the liquid level to the bottom of the dividing baffle.

4. The apparatus of claim 1 wherein said auxiliary panels contain rectangular flow ports alternately spaced near and away from the dividing baffle and wherein the auxiliary panels extend to and against the bottom of aeration chamber, said auxiliary panels being adjacent each other on opposite sides of the dividing baffle and having cut-off corners whose remaining sides slope away from each other to form triangular openings serving as connecting passages to maintain the single zone of communication beneath the dividing baffle.

5. The apparatus of claim 4 wherein the air distributing means is disposed in the triangular opening formed by adjacent auxiliary panels.

References Cited

UNITED STATES PATENTS 3,415,381   12/1968   Thayer _____ 210—220 X

REUBEN FRIEDMAN, Primary Examiner

J. L. DE CESARE, Assistant Examiner

U.S. Cl. X.R.

210—220, 521